(12) United States Patent
Kim et al.

(10) Patent No.: US 8,964,010 B2
(45) Date of Patent: Feb. 24, 2015

(54) DISPLAY DEVICE AND METHOD OF OUTPUTTING AUDIO SIGNAL

(75) Inventors: Heejin Kim, Seoul (KR); Sungkoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 13/096,678

(22) Filed: Apr. 28, 2011

(65) Prior Publication Data

US 2011/0267440 A1 Nov. 3, 2011

(30) Foreign Application Priority Data

Apr. 29, 2010 (KR) .................. 10-2010-0040304

(51) Int. Cl.
| | | |
|---|---|---|
| *H04N 13/04* | (2006.01) | |
| *H04R 5/00* | (2006.01) | |
| *H04N 5/60* | (2006.01) | |
| *G06T 7/00* | (2006.01) | |
| *H04N 21/439* | (2011.01) | |
| *H04N 21/44* | (2011.01) | |
| *H04N 21/81* | (2011.01) | |
| *H04S 7/00* | (2006.01) | |

(52) U.S. Cl.
CPC .............. *H04N 5/60* (2013.01); *G06T 7/0022* (2013.01); *G06T 7/0075* (2013.01); *H04N 21/439* (2013.01); *H04N 21/44008* (2013.01); *H04N 21/816* (2013.01); *H04S 7/305* (2013.01); *H04S 2400/07* (2013.01); *H04S 2420/01* (2013.01); *G06T 2207/10021* (2013.01)
USPC .................... 348/55; 348/E5.026; 381/17

(58) Field of Classification Search
CPC ............................ H04S 2420/01; H04R 5/00
USPC .......... 348/55; 382/154; 381/17, 306
See application file for complete search history.

(56) References Cited

U.S. PATENT DOCUMENTS

| | | | | |
|---|---|---|---|---|
| 6,572,475 | B1 | 6/2003 | Okabe et al. | 463/30 |
| 8,064,754 | B2 * | 11/2011 | Lomba et al. | 386/338 |
| 2002/0159629 | A1 * | 10/2002 | Dutta et al. | 382/154 |
| 2003/0053680 | A1 * | 3/2003 | Lin et al. | 382/154 |
| 2005/0249367 | A1 * | 11/2005 | Bailey | 381/310 |
| 2005/0249382 | A1 * | 11/2005 | Schwab et al. | 382/115 |
| 2006/0247918 | A1 * | 11/2006 | Schmidt et al. | 704/200 |

(Continued)

FOREIGN PATENT DOCUMENTS

| | | |
|---|---|---|
| CN | 1954606 A | 4/2007 |
| CN | 101268685 A | 9/2008 |

(Continued)

OTHER PUBLICATIONS

Chinese Patent Certificate dated May 14, 2014 for Granted Publication No. CN 102300109 B (Application No. 201110159389.0).

(Continued)

*Primary Examiner* — Christopher S Kelley
*Assistant Examiner* — Deirdre Beasley
(74) *Attorney, Agent, or Firm* — Ked & Associates, LLP

(57) ABSTRACT

A display device receives first data for an object to be displayed at a first point in time and second data for the object to be displayed at a second point in time, the second point in time being after the first point in time. A controller determines a difference between the first and second data and controls output of an audio signal based on the difference. The difference is indicative of a change in perceived depth by a viewer.

15 Claims, 11 Drawing Sheets

(56) References Cited

U.S. PATENT DOCUMENTS

| | | | |
|---|---|---|---|
| 2008/0240549 A1 | 10/2008 | Koo et al. | 382/154 |
| 2009/0305787 A1* | 12/2009 | Ikejiri et al. | 463/38 |
| 2010/0272271 A1* | 10/2010 | Hayakawa et al. | 381/59 |
| 2010/0272417 A1* | 10/2010 | Nagasawa et al. | 386/97 |
| 2011/0164769 A1* | 7/2011 | Zhan et al. | 381/307 |
| 2011/0274278 A1* | 11/2011 | Kim | 381/17 |
| 2012/0062700 A1* | 3/2012 | Antonellis et al. | 348/43 |
| 2012/0127264 A1* | 5/2012 | Jung et al. | 348/42 |
| 2012/0243689 A1* | 9/2012 | Jeong et al. | 381/17 |
| 2013/0010969 A1* | 1/2013 | Cho et al. | 381/17 |
| 2013/0028424 A1* | 1/2013 | Kim et al. | 381/17 |

FOREIGN PATENT DOCUMENTS

| | | | |
|---|---|---|---|
| CN | 101350931 A | | 1/2009 |
| CN | 101682793 A | | 3/2010 |
| EP | 0 813 351 A2 | | 12/1997 |
| JP | H08-140200 A | | 5/1996 |
| JP | 2006-128818 A | | 5/2006 |
| JP | 2012060349 A | * | 3/2012 |
| JP | 2012213070 A | * | 11/2012 |

OTHER PUBLICATIONS

European Search Report dated May 19, 2014 issued in Application No. 11 003 491.5.

* cited by examiner

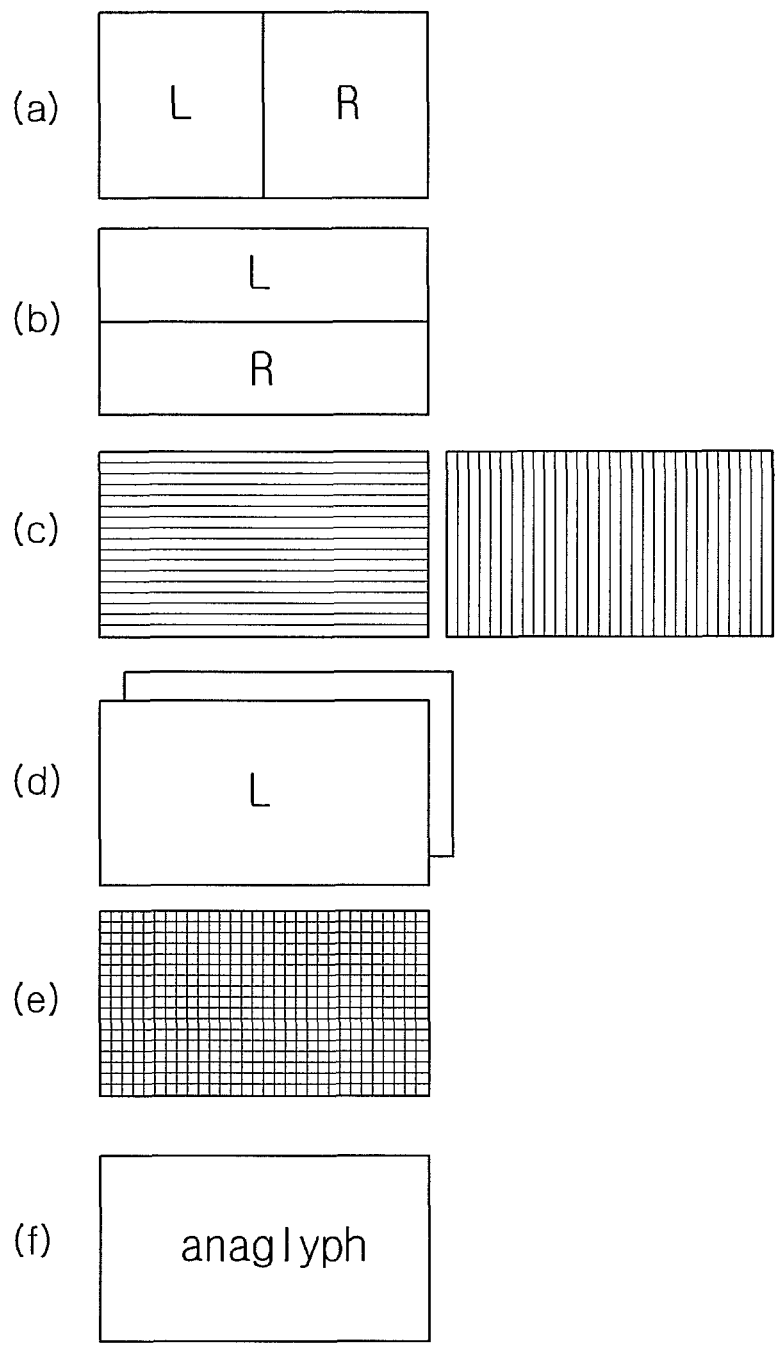

[Fig.2]
(a) 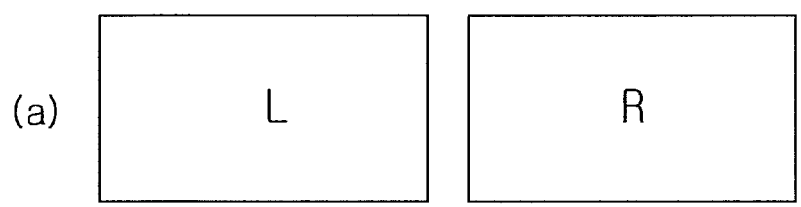
(b) 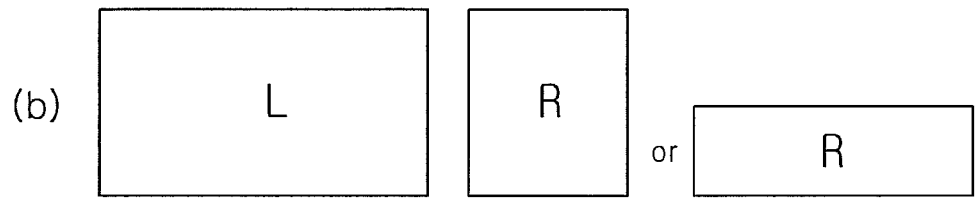
(c) 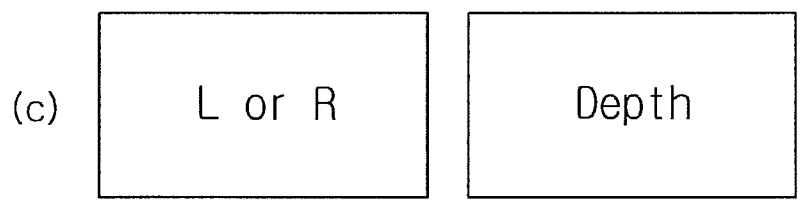

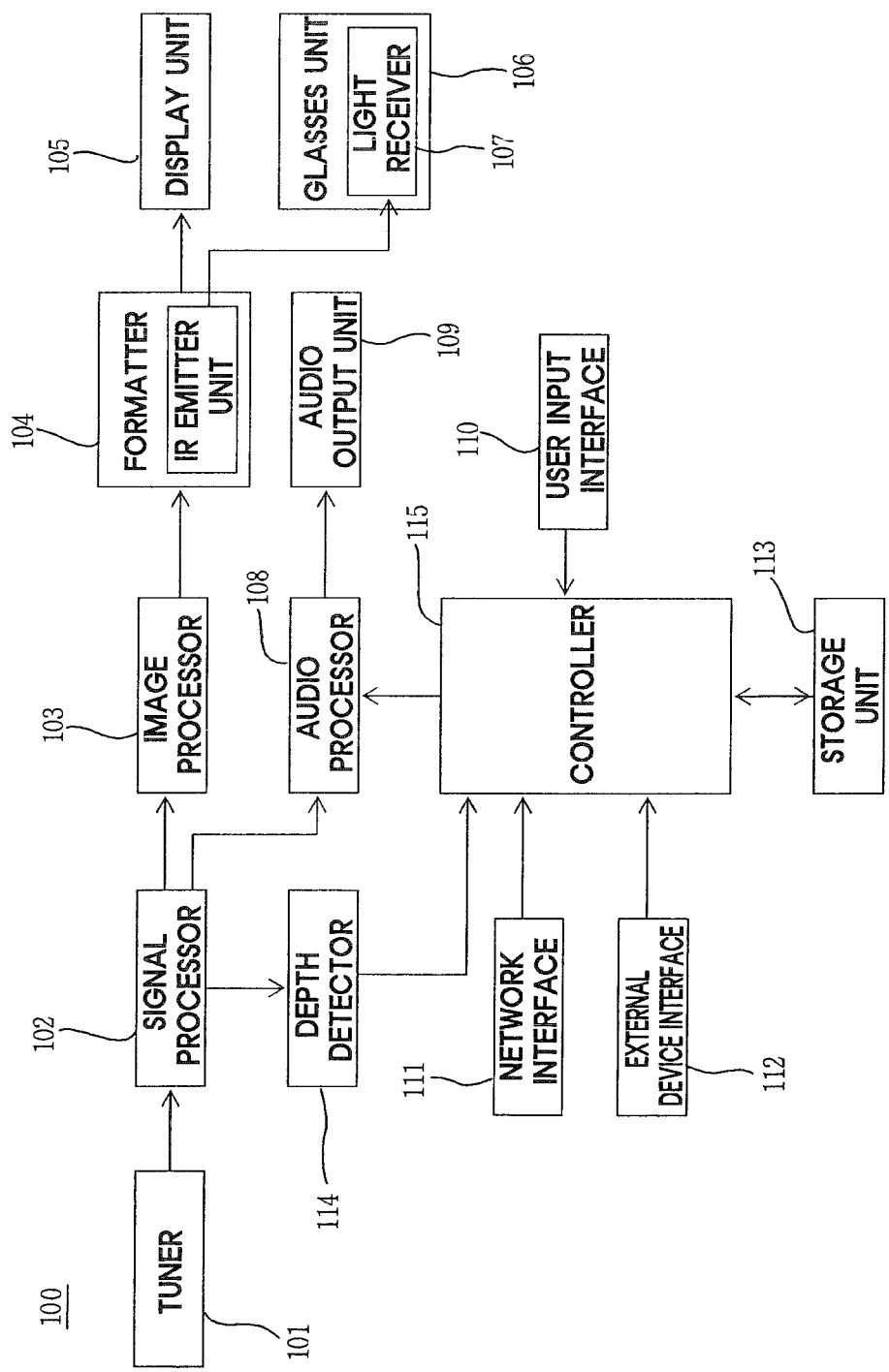
[Fig.3]

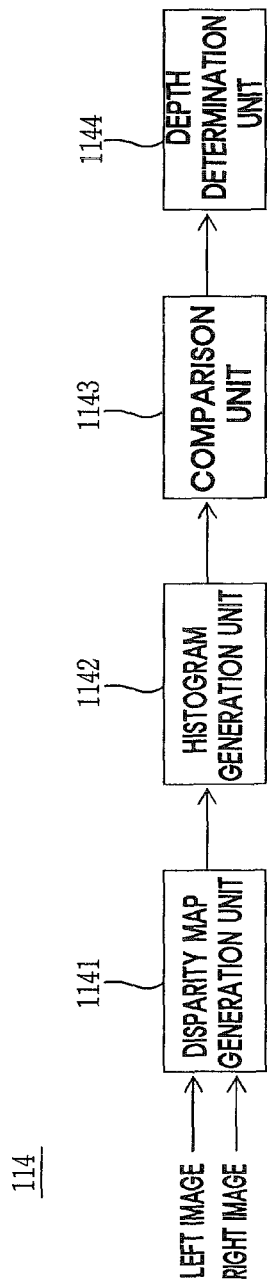

[Fig.5]
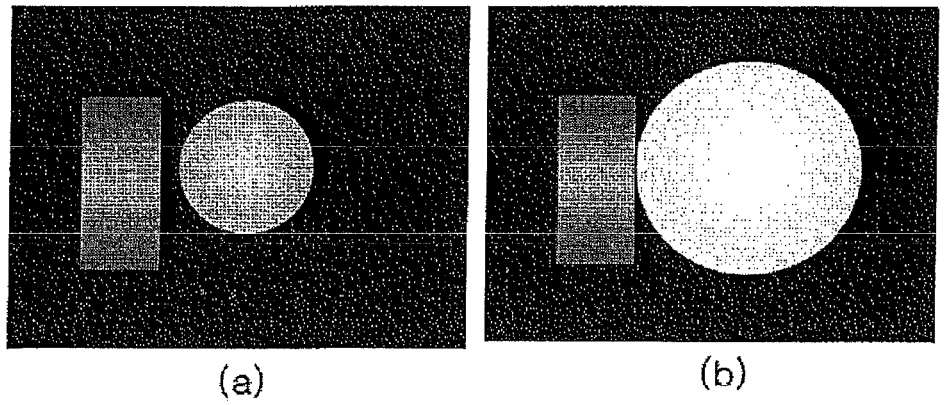
(a) (b)
[Fig.6]
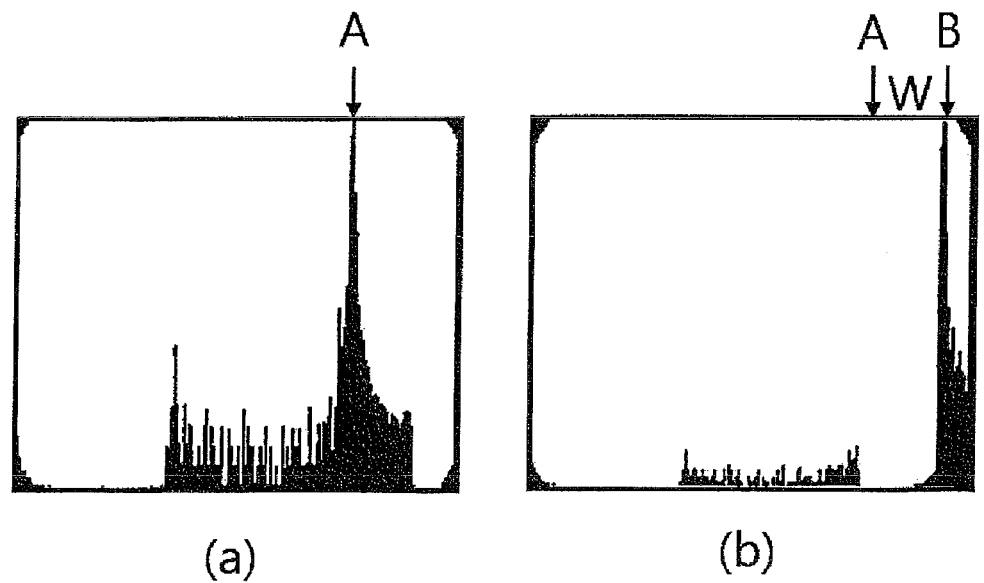
(a) (b)

[Fig.7]
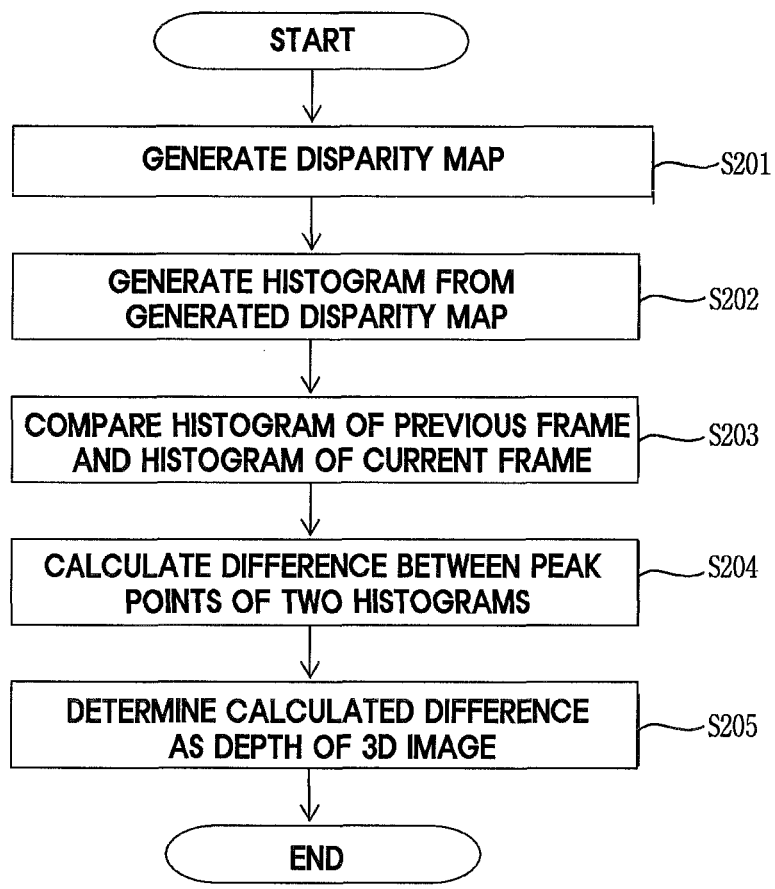

[Fig.8]
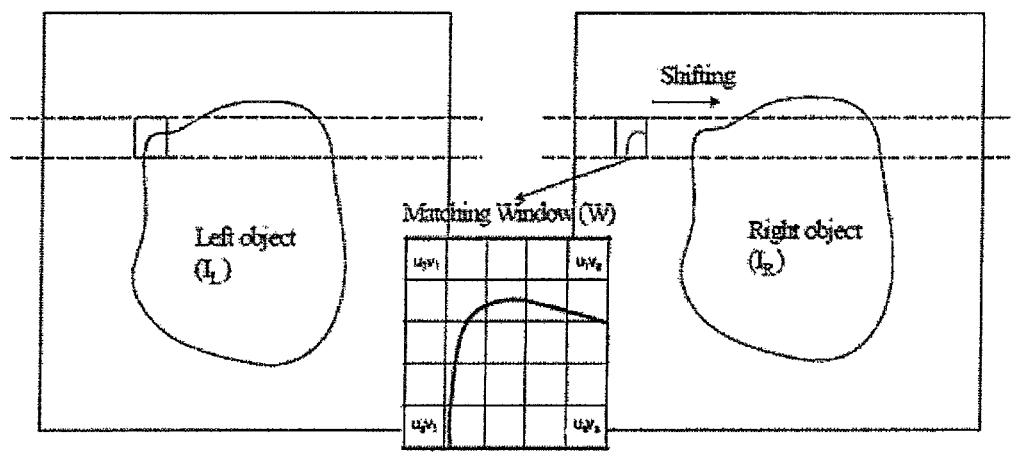
[Fig.9]
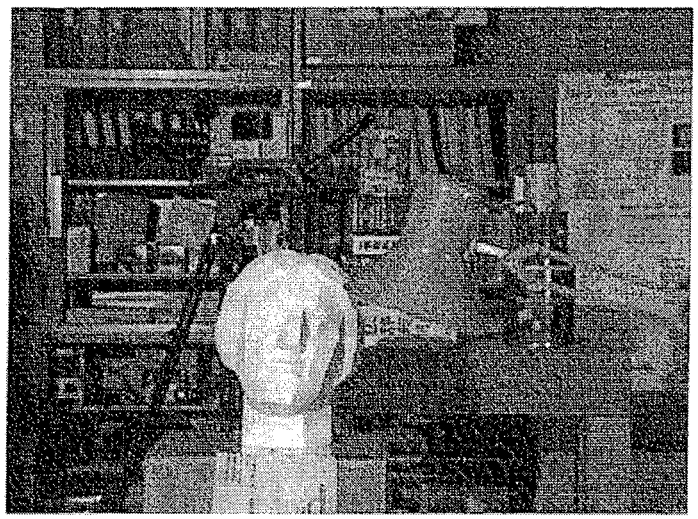

[Fig.10]
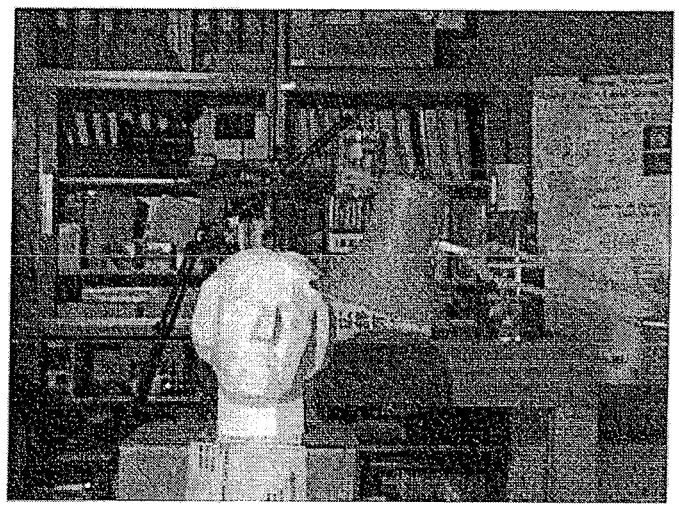
[Fig.11]
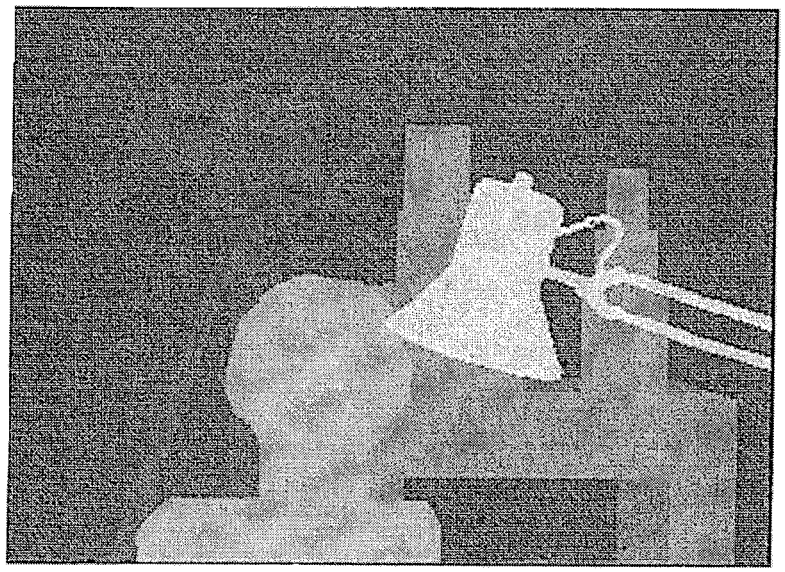

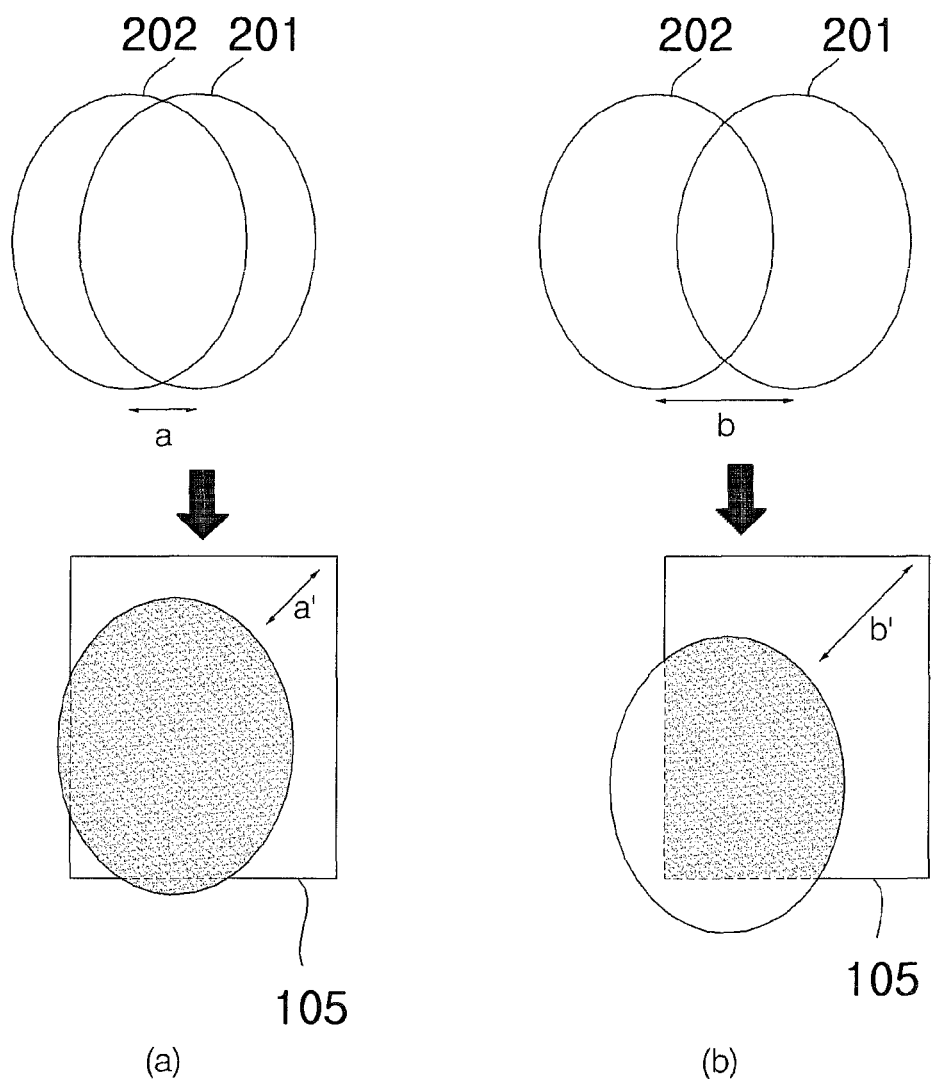

[Fig.13]
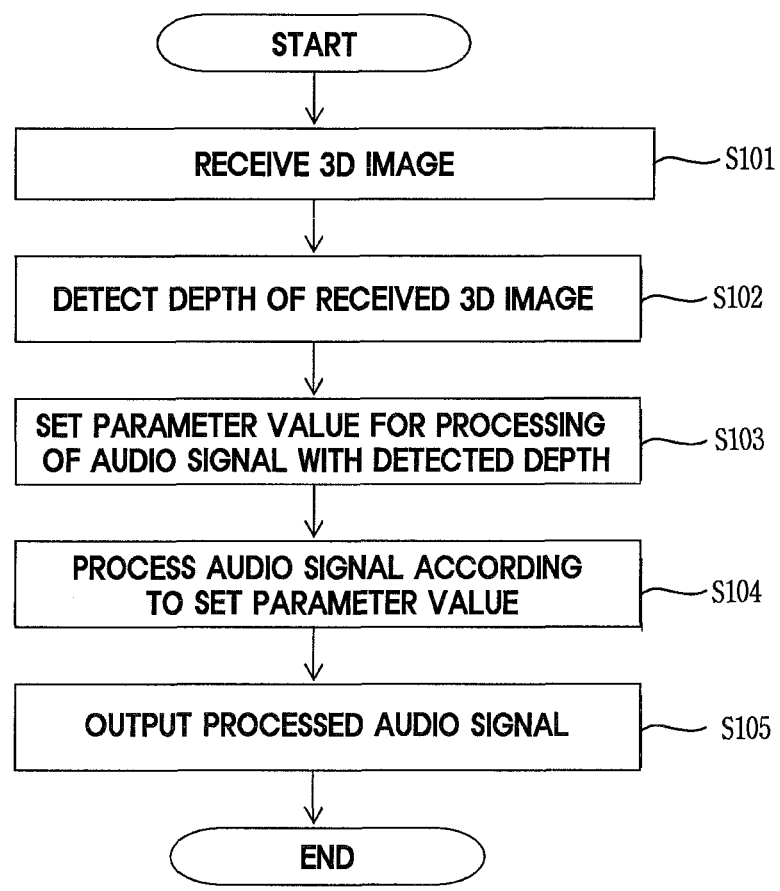

[Fig.14]
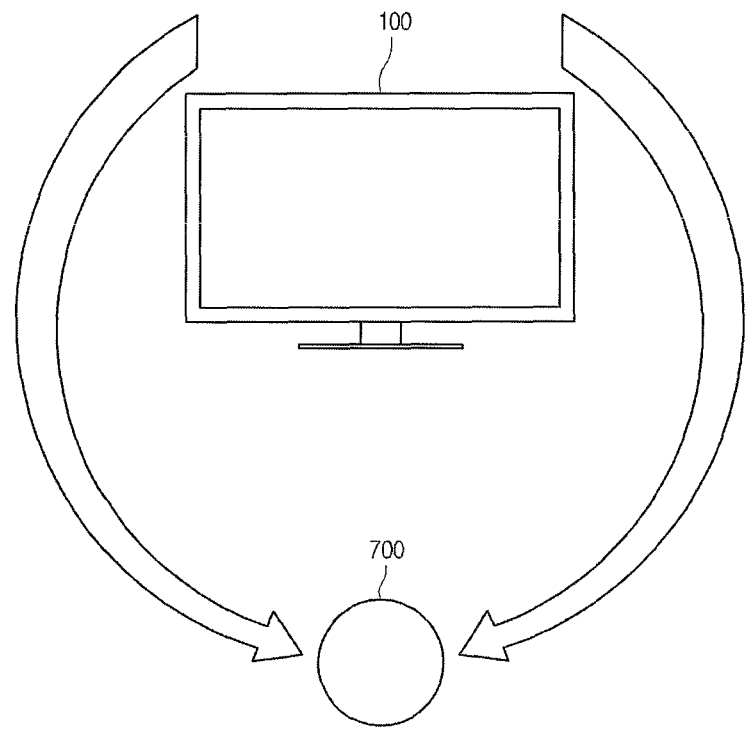
[Fig.15]
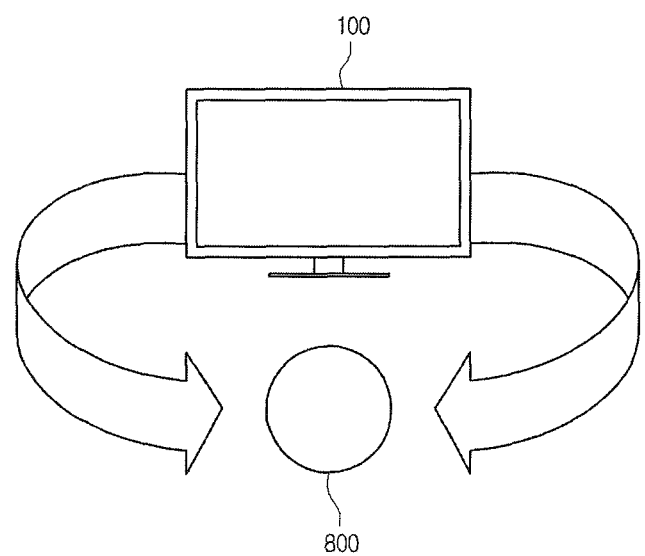

DISPLAY DEVICE AND METHOD OF OUTPUTTING AUDIO SIGNAL

CROSS-REFERENCE TO RELATED APPLICATIONS

The present application claims priority under 35 U.S.C. 119 and 35 U.S.C. 365 to Korean Patent Application No. 10-2010-0040304 filed Apr. 29, 2010, in Korea which is hereby incorporated by reference in its entirety

BACKGROUND

1. Field

One or more embodiments disclosed herein relate to displaying images.

2. Background

An image display apparatus displays broadcast programs and other video signals in analog or digital form. Digital broadcasting offers many advantages over analog broadcasting such as robustness against noise, less data loss, ease of error correction, and the ability to provide high-definition, clear images. Recently, consumer interest has pushed the industry towards three-dimensional (3D) viewing.

BRIEF DESCRIPTION OF THE DRAWINGS

FIGS. 1 and 2 show 3D image formats.
FIG. 3 shows one embodiment of a display device.
FIG. 4 shows a depth detector of FIG. 3.
FIGS. 5 to 11 show a method of detecting depth of a 3D image.
FIGS. 12 and 13 show embodiment(s) of a method to control a display device.
FIGS. 14 and 15 show one type of stereophonic sound effect.

DETAILED DESCRIPTION

The present disclosure relates to a display device and a method of outputting an audio signal, and more particularly, describes a method of outputting an audio signal in a device (hereinafter referred to as a stereoscopic image display device) that displays a Three-Dimensional (3D) image or a stereoscopic image. To describe the present disclosure, a stereoscopic image will be first described below.

As 3D images, there are a stereo (or stereoscopic) image based on two perspectives, and a multi-perspective image based on three perspectives.

The stereo image denotes a pair of left and right images that are obtained by capturing the same subject with a left camera and a right camera that are separated from each other at a certain distance. Also, the multi-perspective image denotes three or more images that are obtained by capturing the same subject with three or more cameras that are separated from each other at a certain distance or angle.

Transmission formats for a stereo image include a single and multi-video stream formats. The single video stream format includes a side by side format of a portion (a) of FIG. 1, a top/down format of a portion (b) of FIG. 1, an interlaced format of a portion (c) of FIG. 1, a frame sequential format of a portion (d) of FIG. 1, a checker board format of a portion (e) of FIG. 1, and an anaglyph format of a portion (f) of FIG. 1.

The side by side format of the portion (a) of FIG. 1 corresponds to a case that horizontally performs ½ sub sampling on a left image L and a right image R, respectively places the sampled left and right images L and R in the left and the right, and thus generates one stereo image.

The top/down format of the portion (b) of FIG. 1 corresponds to a case that vertically performs ½ sub sampling on the left image L and the right image R, respectively places the sampled left and right images L and R in an upper portion and a lower portion, and thus generates one stereo image.

The interlaced format of the portion (c) of FIG. 1 corresponds to a case that vertically performs ½ sub sampling on the left image L and the right image R, alternately places a pixel of the sampled left image L and a pixel of the sampled right image R per line, and thus generates one stereo image. Alternatively, the interlaced format of the portion (c) of FIG. 1 corresponds to a case that horizontally performs ½ sub sampling on the left image L and the right image R, alternately places the pixel of the sampled left image L and the pixel of the sampled right image R by one pixel, and thus generates one stereo image.

The frame sequential format of the portion (d) of FIG. 1 corresponds to a case that does not perform ½ sub sampling on the left image L and the right image R but sequentially, alternately places each of the left and right images L and R as one frame, and thus generates one stereo image.

The checker board format of FIG. 1(e) corresponds to a case that respectively performs ½ sub sampling on the left image L and the right image R in a vertical direction and a horizontal direction, alternately places a pixel of the sampled left image L and a pixel of the sampled right image R by one pixel, and thus generates one stereo image.

As the multi-video stream format, moreover, there are a full left/right format of a portion (a) of FIG. 2, a full left/half format of a portion (b) of FIG. 2, and a 2Dimensions video/depth format of a portion (c) of FIG. 2.

The full left/right format of a portion (a) of FIG. 2 corresponds to a case that sequentially transmits a left image L and a right image R. The full left/half format of a portion (b) of FIG. 2 corresponds to a case that transmits the left image L as-is, and performs ½ sub sampling on the right image R in a vertical direction or a horizontal direction to transmit the sampled image. The 2Dimensions video/depth format of a portion (c) of FIG. 2 corresponds to a case that transmits one of the left and right images L and R, and depth information for generation of another image.

The stereo image or the multi-perspective image may be compressed and coded in a Moving Picture Experts Group (MPEG) type or various types and transmitted. For example, a stereo image based on the side by side format, the top/down format, the interlaced format or the checker board format may be compressed and coded in a H.264/Advanced Video Coding (AVC) type and transmitted. Therefore, a receiving system may decode the stereo image in the reverse of the H.264/AVC type to obtain a 3D image.

Moreover, one of a multi-perspective image and a left image based on the full left/half right format is allocated as a based layer image, and the other is allocated as an enhanced layer image. Subsequently, the based layer image may be coded in the same type as that of a monoscopic image, and the enhanced layer image may be coded only on correlation information between the based layer image and the enhanced layer image and transmitted. Herein, as examples of compression coding types for the based layer image, there are Joint Photographic Experts Group (JPEG), MPEG-1, MPEG-2, and H.264/AVC types. Examples of compression coding types for the enhanced layer image include an H.264/Multi-view Video Coding (MVC) type.

Moreover, the stereo image is allocated as a based layer image and one enhanced layer image, but the multi-perspective image is allocated as one based layer image and a plurality of enhanced layer images. A criterion for dividing the multi-perspective image into a based layer image and one or more enhanced layer images may be determined according to position of a camera or an arrangement type, or may be arbitrarily determined without a special criterion.

A 3D image is generally based on stereo perspective principles of two eyes. A parallax between two eyes, i.e., a binocular parallax due to an interval between the two eyes that are separated from each other by about 65 mm is an important factor that allows three-dimensionality to be felt, and when left and right eyes respectively look at correlated 2D images, a brain may merge the different two images to reproduce the original depth sensitivity and real sensitivity of a 3D image.

3D image display is largely divided into a stereoscopic type, a volumetric type, and a holographic type. For example, a 3D image display device applying a stereoscopic technology is an image display device that adds depth information to a 2D image, and allows an observer to perceive the liveliness and real sensitivity of a 3D structure on the basis of the depth information.

As types of displaying a 3D image, largely, there are a type of wearing glasses and a non-glasses type that does not wear glasses. Herein, the type of wearing glasses is divided into a passive type and an active passive type. The passive type is a type that divides an image into a left image L and a right image R with a polarizing filter and displays the divided images, i.e., a type where a user wears polarizing glasses, which allow both eyes to respectively look at the left and right images L and R and includes the polarizing filter, and looks at the images. The active type is a type that divides a left eye and a right eye with a Liquid Crystal Display (LCD) shutter, i.e., a type that divides a left image L and a right image R by sequentially covering the left and right eyes. Such active type is a type where a time-split screen is repeated in period, and a user wears glasses including an electronic shutter synchronized with the period and looks at an image. The active type may be called a time split type or a shutter glass type.

As representative types known as a non-glasses type, there are a lenticular type where a lenticular lens plate including a vertically-arranged lens array having a cylindrical shape is disposed in front of an image panel, and a parallax barrier type where a barrier layer having a periodic slit is disposed at an upper portion of an image panel.

FIG. 3 is a diagram illustrating a configuration of a display device according to an embodiment. Referring to FIG. 3, a display device 100 includes a tuner 101, a signal processor 102, an image processor 103, a formatter 104, a display unit 105, a glasses unit 106 including a light receiver 107, an audio processor 108, an audio output unit 109, a user input interface 110, a network interface 111, an external device interface 112, a storage unit 113, a depth detector 114, and a controller 115.

Referring to FIG. 4, the depth detector 114 includes a disparity map generation unit 1141, a histogram generation unit 1142, a comparison unit 1143, and a depth determination unit 1144. Hereinafter, each element of FIGS. 3 and 4 will be described.

The tuner 101 selects a Radio Frequency (RF) broadcasting signal, corresponding to a channel selected by a user or all pre-stored channels, from among RF broadcasting signals received through an antenna. Also, the tuner 101 converts the selected RF broadcasting signal into an Intermediate Frequency (IF) or baseband image/audio signal.

For example, when the selected RF broadcasting signal is a digital broadcasting signal, the tuner 101 converts the selected RF broadcasting signal into a Digital IF (DIF) signal.

When the selected RF broadcasting signal is an analog broadcasting signal, the tuner 101 converts the selected RF broadcasting signal into an analog baseband image/audio signal (CVBS/SIF). That is, the tuner 101 may process a digital broadcasting signal or an analog broadcasting signal. The analog baseband image/audio signal (CVBS/SIF) outputted from the tuner 101 may be directly inputted to the controller 115.

Moreover, the tuner 101 may receive an RF broadcasting signal of a single carrier in accordance with an Advanced Television System Committee (ATSC), or an RF broadcasting signal of a multi-carrier in accordance with a Digital Video Broadcasting (DVB) type.

The tuner 101 sequentially selects RF broadcasting signals of all broadcast channels, which are stored with a channel memory function, from among RF broadcasting signals received through the antenna to convert the selected signal into an IF or baseband image/audio signal.

Herein, images included in the broadcasting signal may include a 3D image and 2D image. Therefore, when the 2D image is received, the display device according to an embodiment controls the formatter 104 such that the formatter 104 bypasses the 2D image, thereby maintaining backward compatibility between the 2D image and the 3D image. The 3D image, for example, may be one of the various formats of FIG. 1.

The signal processor 102 processes a broadcasting signal received through the tuner 101. For this, the signal processor 102 includes a demodulator (not shown) for demodulating the broadcasting signal, and a de-multiplexer (not shown) for de-multiplexing the demodulated broadcasting signal.

The demodulator configuring the signal processor 102 receives a DIF signal converted by the tuner 101 to perform a demodulation operation.

For example, when the DIF signal outputted from the tuner 101 is based on the ATSC type, the demodulator performs 8-Vestige Side Band (VSB) or 7-VSB demodulation. Also, the demodulator may perform channel decoding. For this, the demodulator may include a trellis decoder, a de-interleaver, and a Reed-Solomon (RS) decoder, and thus perform trellis decoding, interleaving, and RS decoding.

For example, when the DIF signal outputted from the tuner 101 is based on a DVB type, the demodulator performs Coded Orthogonal Frequency Division Modulation Access (COFDMA) demodulation. Also, the demodulator may perform channel decoding. For this, the demodulator may include a convolution decoder, a de-interleaver, and an RS decoder, and thus perform trellis decoding, interleaving, and RS decoding.

The demodulator may output perform channel decoding and then output a stream signal. Herein, the stream signal may be a signal into which an image signal, an audio signal and a data signal are multiplexed. As an example, the stream signal may be an MPEG-2 Transport Stream (TS) into which an image signal based on an MPEG-2 standard and an audio signal based on a Dolby AC-3 standard are multiplexed. Specifically, the MPEG-2 TS may include a 4-byte header and 184-byte payload.

The demodulator may be separately included according to the ATCS type and the DVB type. That is, as the demodulator, an ATSC demodulator and a DVB demodulator may be included.

The stream signal outputted from the demodulator is inputted to the de-multiplexer.

The de-multiplexer de-multiplexes an input stream. For example, when the MPEG-2 TS is inputted, the de-multiplexer may de-multiplex the MPEG-2 TS into an image signal, an audio signal and a data signal. Herein, the stream signal inputted to the de-multiplexer may be a stream signal outputted from the tuner 101, the demodulator or the external device interface 112.

The image processor 103 image-processes the de-multiplexed image signal. For this, the image processor 103 may include an image decoder and a scalier.

The image decoder decodes the de-multiplexed image signal. The scalier scales resolution of the decoded image signal to be displayed on the display unit 105.

The image decoder may include decoders based on various standards. For example, the image decoder may include at least one of an MPEG-2 decoder, an H.264 decoder, an MPEG-C decoder (MPEG-C part 3), an MVC decoder, and an FTV decoder.

The image processor 103 performs processing for realizing of On-Screen Display (OSD). For this, the image processor 103 may further include an OSD generator (not shown). In outputting of a decoded 3D image, therefore, when an OSD request is received from the outside, the image processor 103 controls the OSD generator such that the OSD generator generates an OSD data. Furthermore, the image processor 103 includes the generated OSD data in the decoded 3D image data and outputs the data.

The formatter 104 receives an image data including a 3D image or an OSD data from the image processor 103 and newly arranges the received data in accordance with a display format of the display unit 105.

The display unit 105 receives the newly-arranged image data from the formatter 104 and outputs the received data on a screen.

A user may view a 3D image that is outputted on a screen through the glasses unit 106. At this point, the formatter 104 generates a sync signal Vsync about a 3D image outputted to the display unit 105. Furthermore, the formatter 104 outputs the generated sync signal Vsync to the light receiver 107 included in the glasses unit 106 through an infrared rays (IR) emitter. The IR emitter is included when necessary, in which case the IR emitter is configured as an internal configuration module of the formatter 104 or may be configured as a separate external configuration module according to a system environment.

In the above description, although not shown in FIG. 3, a Frame Rate Converter (FRC) may be further included in relation to processing of a 3D image when necessary. The FRC converts a frame rate of an input image. For example, the FRC converts a frame rate of 60 Hz into a frame rate of 120 Hz or 24 0Hz. At this point, when the frame rate of 60 Hz is converted into the frame rate of 120 Hz, the same first frame may be inserted between first and second frames, or a third frame predicted from the first and second frames may be inserted between the first and second frames. When the frame rate of 60 Hz is converted into the frame rate of 240 Hz, three equal frames may be further inserted, or three predicted frames may be inserted.

Herein, the image processor 103 and the formatter 104 may be configured as separate modules, but, depending on the case, image processor 103 and the formatter 104 may be configured as one integrated module. In this case, the FRC may be included in the integrated module.

The audio processor 108 receives the audio signal and performs a series of signal processing operation on the received audio signal. An audio signal processed by the audio processor 108 is outputted through the audio output unit 107.

Particularly, the audio processor 108 signal-processes the audio signal according to a parameter setting value of a first group and a parameter setting value of a second group that are determined by the controller 108. Herein the first group includes at least one of a center level parameter, a rear level parameter, a first expansion intensity parameter and a high frequency parameter, and the second group includes at least one of a front level parameter, a Low Frequency Effects (LFE) level parameter, a second expansion intensity parameter and a reverb part parameter.

For this, the audio processor 108 may include an audio decoder decoding the audio signal, a channel separator separating the decoded audio signal by channels, and a 3D processor performing 3D processing on the audio signals separated by channels.

That is, the channel separator may extract a surround signal from right and left audio signals included in the audio signal, and the 3D processor may perform surround effect processing on the extracted surround signal. Also, the channel separator may separate a stereo signal from the right and left audio signals, and the 3D processor may perform 3D processing for giving a surround effect on the separated stereo signal.

Particularly, the audio processor 108 may perform crosstalk cancellation for removing opposed signals from left and right audio signals, and signal-process the audio signal in an HRTF type based on positions of head and ears of a viewer.

That is, the audio processor 108 extracts a signal of a second channel including left and right audio signals from the received audio signal. The audio processor 108 separates a mono signal mainly including a user's voice and a stereo signal mainly including a peripheral signal from the extracted signal of the second channel. The audio processor 108 performs 3D processing on the separated stereo signal by applying a surround algorithm. The surround algorithm includes a 3D positioning technology using the HRTF type, and crosstalk cancellation for realizing surround at a stereo speaker environment. Herein, the audio processor 108 may separate a channel of an audio signal into a rear channel and a front channel. In addition, the audio processor 108 may separate a channel into a 5.1 channel, etc., and when stereo, the audio processor 108 may divide a channel into a left channel and a right channel.

Herein, when reproducing stereo sound with two speakers, sound of a left channel being transferred to a listener's right ear and sound of a right channel being transferred to the listener's left ear are called crosstalk. Therefore, when a corresponding part is removed, 3D sound positioning may be made even at a general speaker environment. Also, a recent surround algorithm may add reverberation to a stereo component for realizing a sound field broader than stereo.

In this case, the audio processor 108 performs signal-processing of the audio signal according to the parameter setting values determined by the controller 108. Herein, the parameters includes the parameter of the first group including the center level parameter, the rear level parameter, the first expansion intensity parameter and the high frequency parameter, and the parameter of the second group including the front level parameter, the LFE level parameter, the second expansion intensity parameter and the reverb part parameter.

The parameter setting values are determined according to a depth of the 3D image. At this point, the setting values of parameters of the first group increase in proportion to the increase in depth of the 3D image, and the setting values of parameters of the second group increase in inverse proportion to the increase in depth of the 3D image.

That is, when the depth of the 3D image increases, the setting values of the center level parameter, rear level parameter, first expansion intensity parameter and high frequency parameter of the first group increase in proportion to the increased depth, and the setting values of the front level parameter, LFE level parameter, second expansion intensity parameter and reverb part parameter of the second group decrease in inverse proportion to the increased depth.

To the contrary, when the depth of the 3D image decreases, the setting values of the center level parameter, rear level parameter, first expansion intensity parameter and high frequency parameter of the first group decrease in proportion to the decreased depth, and the setting values of the front level parameter, LFE level parameter, second expansion intensity parameter and reverb part parameter of the second group increase in inverse proportion to the decreased depth.

The center level parameter is a parameter for controlling the level of a mono signal, i.e., a voice signal. The front level parameter is a parameter for controlling the level of a left/right signal of a front channel. The rear level parameter is a parameter for controlling the level of a left/right signal of a rear channel. The first expansion intensity parameter is a parameter for controlling the expansion sensitivity size of a high frequency band, and the second expansion intensity parameter is a parameter for controlling the expansion sensitivity size of a low frequency band. The LFE level parameter is a parameter for controlling the level of a high-pitched tone with high frequency effect. The reverb part parameter is a parameter for controlling the size of reverberation to give an echo effect.

Herein, the rear channel may be an audio signal outputted from the rear of the display device 100. The front channel may be an audio signal outputted from the front of the display device 100. A center channel may be an audio signal outputted from the center of the display device 100.

The user input interface 110 transfers a signal inputted by a user to the controller 115, or transfers a signal from the controller 115 to the user.

For example, the user input interface 110 may receive a user input signal such as power-on/off, channel selection or screen setting from a separate remote controller, or transmit a signal from the controller 115 to the remote controller, in various communication types such as an RF communication type and an IR communication type.

Moreover, for example, the user input interface 110 may transfer a user input signal, which is inputted from a local key (not shown) such as a power key, a channel key, a volume key or a setting key, to the controller 115.

The user input interface 110 may transfer a user input signal, which is inputted from a sensing unit (not shown) sensing the user's gesture, to the controller 115, or transfer a signal from the controller 115 to the sensing unit. Herein, the sensing unit may include a touch sensor, an audio sensor, a position sensor, and a motion sensor.

The network interface 111 provides an interface for connecting the display device 100 to a wired/wireless network including an Internet network. The network interface 111 may include an Ethernet terminal for access to a wired network. Wireless Local Area Network (WLAN), Wi-Fi, Wireless Broadband (Wibro), World Interoperability for Microwave Access (Wimax) and High Speed Downlink Packet Access (HSDPA) communication standards may be used for access to a wired network.

The network interface 111 may receive content or data provided by an Internet/content provider or a network operator over a network. That is, the network interface 111 may receive contents such as a movie, an advertisement, a game, Video On Demand (VOD) and a broadcasting signal and information regarding the contents, which are provided by the Internet/content provider, over a network. Also, the network interface 111 may receive update information and update file of a firmware provided by the network operator. The network interface 111 may transmit data to the Internet/content provider or the network operator.

Moreover, for example, the network interface 111 may access the an Internet Protocol (IP) TV, receive an image signal, an audio signal or a data signal which has been processed by a set-top box for IPTV so as to enable two-way communication, and transfer the received signal to the controller 115. The network interface 111 may transfer signals processed by the controller 115 to the set-top box for IPTV.

The IPTV may include an ADSL-TV, a VDSL-TV or an FTTH-TV according to the kind of delivery network. The IPTV may include TV over DSL, Video over DSL, TV over IP (TVIP), or broadband TV (BTV). Also, the IPTV may include a full browsing TV or an Internet TV accessible to Internet.

The external device interface 112 may transmit/receive data to/from an external device accessed thereto. For this, the external device interface 112 may include an A/V input/output unit (not shown) or a wireless communication unit (not shown).

The external device interface 112 may access an external device such as a Digital Versatile Disk (DVD), a blue ray, a game machine, a camera, a camcorder, or a computer (for example, a notebook computer) in a wired/wireless way. The external device interface 112 transfers an external image, audio or data signal outputted through an external device accessed thereto, to the controller 115 of the display device 100. Also, the external device interface 112 may output an image, audio or data signal processed by the controller 115 to an external device accessed thereto. For this, the external device interface 112 may include an A/V input/output unit (not shown) or a wireless communication unit (not shown).

The A/V input/output unit may include a Universal Serial Bus (USB) terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, and a D-SUB terminal in order for an image and audio signal of an external device to be inputted to the display device 100.

The wireless communication unit may wirelessly perform Near Field Communication (NFC) with another electronic device. The display device 100 may be network-connected to another electronic device according to a communication standard such as Bluetooth, Radio Frequency Identification (RFID), Infrared Data Association (IrDA), Ultra Wideband (UWB), ZigBee, or Digital Living Network Alliance (DLNA).

Moreover, the external device interface 112 may access various set-top boxes through at least one of the above-described terminals and perform an input/output operation with the set-top box.

The storage unit 113 may store a program for processing and controlling each signal in the controller 115, and store a signal-processed image, audio or data signal.

The storage unit 113 may temporarily store an image, audio or data signal inputted to the external device interface 112. Also, the storage unit 113 may store information regarding a predetermined broadcast channel with a channel memory function such as a channel map.

The storage unit 113 may include at least one type of storage medium among a flash memory type, a hard disk type, a multimedia card micro type, a card type of memory (for example, an SD or XD memory), a Random Access Memory (RAM), and a Read Only Memory (ROM) (for example, an Electrically Erasable and Programmable Read Only Memory (EEPROM)). The display device 100 may replay a file (for example, a moving image file, a still image file, a music file, a document file, etc.) to provide the replayed file to a user.

The storage unit 113 may store distance information between a plurality of audio output units 109, distance information between the audio output unit 109 and a listener, gain information regarding each channel, etc.

The depth detector 114 detects the depth of the 3D image. The depth detector 114 may detect the depth of the 3D image with an additional information data included in the received broadcasting signal.

That is, the received broadcasting signal is composed of an image signal, an audio signal and an additional information signal. The received additional information signal may include depth information of the received image signal (specifically, a 3D image).

Therefore, the depth detector 114 analyzes an additional information data separated by the de-multiplexer, and when depth information of the 3D image exists in the analyzed additional information data, the depth detector 114 detects the depth information and transfers the detected information to the controller 115.

Moreover, when the depth information of the 3D image does not exist in the analyzed additional information data, the depth detector 114 detects the depth with the analyzed result of the received image.

For this, the depth detector 114 includes the disparity map generation unit 1141, the histogram generation unit 1142, the comparison unit 1143, and the depth determination unit 1144.

The disparity map generation unit 1141 analyzes the 3D image to generate a disparity map. That is, the 3D image includes a left image and a right image. The disparity map generation unit 1141 generates the disparity map from the 3D image including a left image and a right image with a binocular parallax between the left image and the right image.

The disparity map is to express a disparity of each object, which is determined from a difference between the left image and the right image, as brightness of the each object. A matching method of a 3D image is largely divided into a region-based method, a feature-based method, and a pixel-based method. The region-based method finds a correspondence point for matching by region unit. That is, the region-based method matches a 3D image with a specific-size window by region unit, and has a correlation relationship according to the size of a local region. Therefore, the region-based method determines an appropriate window size in consideration of accuracy and calculation speed in matching.

In block matching, as illustrated in FIG. 7, when left and right images are horizontal, the left image and the right image horizontally move by a matching window size, dx is found in a position where correlation is highest, and disparity is predicted. Disparity in a stereo image is small shown in an object far from a camera and largely shown in an object close to the camera. Representing the disparity difference as a brightness level is the disparity map (or, a depth map). That is, a closer object is displayed brightly, a farther object is displayed darkly, and thus distance information of a target object is displayed.]

FIGS. 8 and 9 show examples of left and right images in a 3D image, and FIG. 10 shows an example of a disparity map extracted from the images of FIGS. 8 and 9. As shown in FIG. 10, lighting of a close stand is displayed brighter than that of a rear camera or desk. Various methods of generating a disparity map from a stereo image are being proposed, and the present invention is not limited to a specific method of generating a disparity map.

The histogram generation unit 1142 receives the disparity map generated by the disparity map generation unit 1141, and generates a histogram with the receive disparity map.

FIG. 5 shows a disparity map for an object approaching a camera, and FIG. 6 shows a histogram corresponding to the disparity map of FIG. 5.

As shown in portions (a) and (b) of FIG. 5, it can be seen that a sphere is approaching a camera, and therefore, the size of a sphere in the portion (b) is further enlarged than that of a sphere in the portion (a) and the sphere in the portion (b) is brighter than the sphere in the portion (a). Accordingly, as shown in portions (a) and (b) of FIG. 6, it can be seen that a peak of a histogram is in a position A in the portion (a) and then moves to a position B, being a brighter value, by W in the portion (b). That is, as the sphere is approached, a distance to the sphere becomes shorter. Therefore, the sphere becomes brighter, and thus, the number of pixels of a bright value corresponding to a position B of the histogram increases in the portion (b) of FIG. 6.

In this embodiment, whether an object becomes closer or farther away is determined with characteristic where as an object is approached, a peak point in a histogram of a disparity map moves. In other words, whether depth of a 3D image increases or decreases is determined with moving characteristic of a peak point in the histogram.

For this, the histogram generation unit 1142 generates a histogram from a disparity map of a previous frame, and generates a histogram from a disparity map of a current frame.

The comparison unit 1143 compares the histogram of the previous frame and the histogram of the current frame which have been generated by the histogram generation unit 1142, and transfers the compared result of the histograms of the two frames to the depth determination unit 1144.

That is, a moving distance of an object that becomes closer or farther away is calculated with a difference between peak points of the histograms of the two frames. Also, by subtracting a histogram of a previous frame from a histogram of a current frame, the comparison unit 1143 may remove information regarding a stationary portion and extract only information regarding a moving portion, and thus determine moving of a peak point with the extracted information.

The depth determination unit 1144 determines the final depth of the 3D image with the compared result of the comparison unit 1143.

Since each gray scale value in a histogram of a disparity map represents a distance from a camera, the depth determination unit 1144 may calculate a difference value between a distance value based on a gray scale level of a peak point in a histogram corresponding to a current frame and a distance value based on a gray scale level of a peak point in a histogram of a previous frame, as depth of the 3D image. Herein, the depth of the 3D image is a moving distance of the peak point in the histogram of the current frame and the peak point in the histogram of the previous frame.

The controller 115 controls an overall operation of the display device 100. For example, the controller 115 may control the tuner 101 such that the tuner 101 tunes RF broadcast corresponding to a channel selected by a user or a predetermined channel.

Moreover, the controller 115 may control the display device 100 according to a user command inputted through the user input interface 110 or an internal program.

For example, the controller 115 controls the tuner 101 in order for a signal of a selected channel to be inputted according to a certain channel selection command received through the user input interface 110. The controller 115 processes an image, audio or data signal of the selected channel. The controller 115 may allow channel information selected by the user to be outputted through the display unit 105 and the audio output unit 109 together with a processed image or audio signal.

As another example, the controller 115 may allow an image signal or an audio signal from, which is inputted through the external device interface 112 and is outputted from an external device (for example, a camera or a camcorder), to be outputted through the display unit 105 and the audio output unit 109 according to an external device image reproduction command receive through the user input interface 110.

The controller 115 may control the display unit 105 in order to display an image. For example, the controller 115 may perform control in order for the display unit 115 to display a broadcast image inputted through the tuner 101, an external input image inputted through the external device interface 112, an image inputted through the network interface 111, or an image stored in the storage unit 113.

Herein, the image displayed on the display unit 105 may be a moving image or a still image, and a 2D image or a 3D image.

The controller 115 allows a 3D object on a certain object among an image displayed by the display unit 105 to be generated and displayed. For example, an object may be at least one of an accessed web screen (for example, newspaper, magazine, etc.), Electronic Program Guide (EPG), various menus, Widjet, icons, a still image, a moving image, and a text.

Such a 3D object may be processed to have a depth different from that of an image displayed on the display unit 105. The 3D object may be processed such that the 3D object is shown to protrude further than an image displayed on the display unit 105.

The controller 115 determines a setting value, which is based on depth of a 3D image detected by the depth detector 114, for at least one parameter for signal-processing of an audio signal, and performs control in order for the audio signal to be signal-processed on the basis of the determined setting value.

The parameter determined by the controller 115 includes the parameter of the first group including the center level parameter, the rear level parameter, the first expansion intensity parameter and the high frequency parameter, and the parameter of the second group including the front level parameter, the LFE level parameter, the second expansion intensity parameter and the reverb part parameter.

Particularly, when transmitting one of a left image L and a right image R together with depth information for generating another image, the controller 115 determines a setting value for the parameter on the basis of the depth information detected by the depth detector 114.

The depth is the degree where a right image of a 3D image protrudes from a left image of the 3D image. That is, on the assumption of that the transmitted data are the left image and depth information, when the depth is large, this denotes that the degree of protrusion of an object is large, but when the depth is small, this denotes that the degree of protrusion of an object is small. Also, when the transmitted data is a right image, a user may perceive the degree of depth of the object unlike the left image.

When the degree of protrusion of the object is large, this denotes that a noticeable portion exists in a currently displayed 3D image, but when the degree of protrusion of the object is small, this denotes that a noticeable portion does not exist in a currently displayed image.

Therefore, the controller 115 allows a surround effect on the audio signal to be realized according to the depth.

In a general surround effect, space sensitivity and stereo sensitivity are emphasized by widening the range of a signal for directionality (i.e., left directionality and right directionality) of an audio signal. However, when the surround effect is realized, depth sensitivity and position sensitivity for a front direction and rear direction of an audio signal is reduced.

Therefore, the controller 115 allows a left direction and right direction of the audio signal to be emphasized or allows the front direction and rear direction of the audio signal to be emphasized, according to the depth of the 3D image.

That is, when depth of a 3D image is large, this denotes that the degree of protrusion of an object displayed on a screen is large and a noticeable object is displayed on the screen, and thus the controller 115 determines the setting value of the parameter in order for front directionality and rear directionality to be emphasized further than left directionality and right directionality. Also, when the depth of the 3D image is small, this denotes that the degree of protrusion of the object displayed on the screen is small and there is no noticeable portion on the screen, and thus the controller 115 determines the setting value of the parameter in order for left directionality and right directionality to be emphasized further than 3D positioning, thereby realizing a broad sound field and a grand surround effect.

In this case, as the setting values of the center level parameter, rear level parameter, first expansion intensity parameter and high frequency parameter included in the parameter of the first group increase, front directionality and rear directionality are emphasized. As the setting values of the front level parameter, LFE level parameter, second expansion intensity parameter and reverb part parameter included in the parameter of the second group increase, left directionality and right directionality are emphasized.

Therefore, as the detected depth increases, the controller 115 increases the setting value of the parameter belonging to the first group. Also, when the setting value of the parameter belonging to the first group increases, the controller 115 decreases the setting value of the parameter belonging to the second group in correspondence with the increase.

Moreover, as the detected depth decreases, the controller 115 increases the setting value of the parameter belonging to the second group. Also, when the setting value of the parameter belonging to the second group increases, the controller 115 decreases the setting value of the parameter belonging to the first group in correspondence with the increase.

Referring to FIG. 11, it can be seen that a depth a' of an object in a portion (a) of FIG. 11 is less than a depth b' of an object in a portion (b) of FIG. 11 when an interval 'a' between left and right images 201 and 202 in the portion (a) of FIG. 11 is less than an interval 'b' between left and right images 201 and 202 in the portion (b) of FIG. 11.

As shown in FIG. 11, when depth of a previous frame is a' and depth of a current frame is b', the controller 115 increases the setting values of the parameter belonging to the first group in proportion to the increase from the depth a' to the depth b'. In this case, also, the controller 115 decreases the setting values of the parameter belonging to the second group.

On the other hand, when depth of a previous frame is b' and depth of a current frame is a', the controller 115 increases the setting values of the parameter belonging to the second group in proportion to the decrease from the depth b' to the depth a'. In this case, also, the controller 115 decreases the setting values of the parameter belonging to the first group.

FIGS. 12 and 13 are flowcharts illustrating an operation method of a display device according to an embodiment. FIGS. 14 and 15 are diagrams for describing an example of the operation method of the display device in FIGS. 12 and 13.

Referring to FIG. 12, first, the display device 100 receives a 3D image in operation S101. Herein, the received 3D image may be an external input image from an external device, an image inputted from a content provider over a network, a broadcast image from a broadcasting signal received by the tuner 101, or an image stored in the storage unit 113.

The controller 115 may determine whether the received image is a 3D image. For example, the controller 115 may receive information indicating whether an image is a 3D image in metadata or a header of an input image stream, and determine whether the received image is a 3D image on the basis of the received information.

Next, the display device 100 detects depth of the received 3D image in operation S102. The depth detector 114 detects the depth of the received 3D image.

For example, when an image included in a received broadcasting signal is a 3D image, the depth detector 114 analyzes additional information regarding the 3D image. Furthermore, when information indicating the depth of the 3D image is included in the analyzed additional information, the depth detector 114 extracts the information to detect the depth of the 3D image.

Moreover, when information indicating the depth of the 3D image is not included in the additional information, the depth detector 114 generates a disparity map with the received 3D image, generates a histogram with the generated disparity map, and detects the depth of the 3D image with a value of a peak point in the generated histogram.

The display device 100 determines whether 3D signal processing with the detected depth is required, and when the 3D signal processing is required, the display device 100 sets at least one parameter value for processing an input audio signal in response to the detected depth in operation S103.

For example, when the depth is not changed, i.e., when depth of a previous frame is the same as that of a current frame, the controller 115 determines 3D signal processing as not being required, and thus maintains preset parameter values as-is.

Moreover, when the depth is changed, i.e., when depth of a previous frame differs from that of a current frame, the controller 115 determines 3D signal processing as being required, and thus changes preset parameter values according to the depth of the current frame.

Herein, the detected depth may have a specific constant value, or have a specific +/− value.

For example, when the depth is detected with the received additional information, the depth may have a specific constant value. In this case, when the constant value is small, this denotes that the degree of protrusion of an object included in the 3D image is small. When the constant value is large, this denotes that the degree of protrusion of an object included in the 3D image is large.

When the depth is detected with a value of a peak point in a histogram, the depth may have a specific +/− value.

That is, when depth of a previous frame is greater than that of a previous frame, the detected depth has a specific + value. To the contrary, when the depth of the previous frame is less than that of the previous frame, the detected depth has a specific − value.

As described above, when the detected depth has a specific constant value, the controller 115 determines a setting value for at least one parameter so as to be in correspondence with the constant value.

For example, the storage unit 113 may store a setting value of at least one parameter to be determined according to a constant value corresponding to each depth. When the setting values are stored in the storage unit 113, the controller 115 extracts a setting value corresponding to the detected depth from the storage unit 113, and allows a received audio signal to be signal-processed by applying the extracted setting value to the audio processing unit 108.

In this case, the determined setting value increases or decreases according to the depth. For example, when the depth is a + value, this denotes that depth of a 3D image has increased, the controller 115 increases the setting value of the parameter belonging to the first group, but decreases the setting value of the parameter belonging to the second group.

To the contrary, when the depth is a − value, this denotes that depth of a 3D image has decreased, the controller 115 decreases the setting value of the parameter belonging to the first group, but increases the setting value of the parameter belonging to the second group.

When the controller 115 has determined a setting value of at least one parameter, the audio processor 108 signal-processes a received audio signal by applying the determined setting value in operation S104. The signal-processing of the audio signal may be performed as follows.

The audio processor 108 separates the received audio signal by channels. For example, audio processor 108 may separate a rear channel and a front channel from among the audio signal. The rear channel is an audio signal outputted from the rear of the display device 100, and the front channel is an audio signal outputted from the front of the display device 100. In addition, the audio processor 108 may separate the audio signal into 5.1 channel, etc., or separate the audio signal into a left channel and a right channel when stereo.

When the audio signal is separated by channels, the audio processor 108 performs signal processing by applying the setting values of the determined parameter for the audio signals separated by channels.

For example, if the depth is large, the audio processor 108 may perform signal processing in order to emphasize sound for front directionality and rear directionality when the audio signal is outputted. To the contrary, if the depth is small, the audio processor 108 may perform signal processing in order to emphasize sound for left directionality and right directionality when the audio signal is outputted.

That is, as shown in FIG. 14, when the audio processor 108 emphasizes a signal for front directionality and rear directionality of the audio signal, a listener 700 (i.e., a user) may listen sound emphasizing depth sensitivity and position sensitivity instead of an effect emphasizing "widening". In other words, when the controller 115 increases a setting value for the parameter of the first group including at least one of the center level parameter, the rear level parameter, the first expansion intensity parameter and the high frequency parameter and decreases a setting value for the parameter of the second group including at least one of the front level parameter, the LFE level parameter, the second expansion intensity parameter and the reverb part parameter, as shown in FIG. 14, sound emphasizing depth sensitivity and position sensitivity is outputted.

Moreover, as shown in FIG. 15, when the audio processor 108 emphasizes a signal for left directionality and right directionality of the audio signal, a listener 800 may listen sound emphasizing space sensitivity and stereo sensitivity instead of an effect emphasizing depth sensitivity and position sensitivity.

In other words, when the controller 115 decreases a setting value for the parameter of the first group including at least one of the center level parameter, the rear level parameter, the first expansion intensity parameter and the high frequency parameter and increases a setting value for the parameter of the second group including at least one of the front level parameter, the LFE level parameter, the second expansion intensity parameter and the reverb part parameter, as shown in FIG. 15, sound emphasizing space sensitivity and stereo sensitivity is outputted.

As described above, when the audio processor 108 signal-processes the audio signal, the signal-processed audio signal is outputted through the audio output unit 109 in operation S105.

According to this embodiment, provided can be a stereophonic sound technology that is differentiated from the existing standardized stereophonic technology, and a user's satisfaction can be enhanced by providing a stereophonic sound technology in accordance with a 3D image display device.

In the above-described depth detection method, a method of detecting a histogram will be described below.

Referring to FIG. 13, first, a disparity map is generated in operation S201. The disparity map generation unit 1141 generates the disparity map from a 3D moving image which includes left and right images composing a 3D image, by using binocular parallax between the left and right images.

The disparity map is to express a disparity (which may be referred to as a depth) of each object, which is determined from a difference between the left image and the right image, as brightness of the each object.

That is, brightness of each object expressed in the disparity map represents depth of a corresponding object. For example, when an object expressed in the disparity map is bright, this denotes that depth of a corresponding object is large, but when an object expressed in the disparity map is dark, this denotes that depth of a corresponding object is small.

Moreover, the disparity map generation unit 1141 generates a disparity map for each frame, and transfers the generated disparity map for each frame to the histogram generation unit 1142.

Next, a histogram is generated from the generated disparity map in operation S202. The histogram generation unit 1142 generates the histogram of FIG. 6 with the generated disparity map that is as shown in FIG. 5. The histogram generation unit 1142 generates a histogram for each frame with the transferred disparity for each frame.

Next, the generated histograms are compared in operation S203. That is, the comparison unit 1143 compares a histogram of a previous frame and a histogram of a current frame which have been generated by the histogram generation unit 1142, and outputs a result value based on the compared result. The comparison unit 1143 determines whether an object becomes closer or farther away using characteristic where as an object is approached, a peak point in a histogram of a disparity map moves.

Subsequently, a difference between peak points of two frames is calculated with the result value based on the compared result in operation S204. For this, by subtracting a histogram of a previous frame from a histogram of a current frame, the comparison unit 1143 may remove information regarding a stationary portion and extract only information regarding a moving portion, and thus determine moving of a peak point with the extracted information. Herein, since each gray scale value in a histogram of a disparity map represents a distance from a camera to an object, the depth determination unit 1144 may calculate a difference value between a gray scale level value of a peak point in a histogram of a previous frame and a gray scale level value of a peak point in a histogram of a current frame.

When the difference value is calculated, the calculated difference value is determined as a depth for a current frame in operation S205.

The method of outputting an audio signal and the display device providing the same according to an embodiment have been described above, but the embodiments may be applied to a system providing an audio output service including the essential content of the present invention, and a computer-readable recording medium for executing a program including the system in the computer.

According to embodiments, provided can be a stereophonic sound technology that is differentiated from the existing standardized stereophonic technology, and by outputting the audio signal in linkage with the depth information of the 3D image data, stereophonic sound can be vividly provided.

As described, one or more embodiments provide a display device and a method of outputting an audio signal, which output an audio signal in linkage with depth information of a 3D image data. These or additional embodiments provide a display device and a method of outputting an audio signal, which accurately calculate depth information of a 3D image data.

In one embodiment, a method of outputting an audio signal in a display device includes: receiving a broadcasting signal; detecting depth of a Three-Dimensional (3D) image included in the broadcasting signal; signal-processing an audio signal inputted in correspondence with the 3D image, on the basis of the detected depth; and outputting the signal-processed audio signal.

In another embodiment, a display device includes: a display unit displaying a 3D image included in a received broadcasting signal; an audio output unit outputting an audio signal included in the received broadcasting signal; a detector detecting depth of the displayed 3D image; and a controller setting at least one parameter value for the audio signal according to the detected depth, and performing control for a signal-processed audio signal to be outputted through the audio output unit on the basis of the set parameter value.

According to another embodiment, a method of controlling a display device, comprising: receiving first data for an object to be displayed on the display screen at a first point in time; receiving second data for the object to be displayed on the display screen at a second point in time, the second point in time being after the first point in time; determining a difference between the first and second data, the difference being indicative of a change in perceived depth by a viewer; and controlling output of an audio signal based on the difference.

The determining step comprises generating a first disparity map based on the first data; generating a second disparity map based on the second data; and determining the change in perceived depth based on the first and second disparity maps.

The first data may be a first frame comprising left and right images and the second data is a second frame comprising left and right images, the first disparity map is generated based on a comparison of the left and right images of the first frame, and the second disparity map is generated based on a comparison of the left and right images of the second frame.

The method further includes generating a first histogram from the first disparity map; generating a second histogram from the second disparity map; and determining the change in perceived depth based on a comparison of the first and second histograms.

In addition, the method includes identifying a peak position in the first histogram; identifying a peak position in the second histogram; and determining the change in perceived depth based on a difference between the peak positions of the first and second histograms.

The controlling step includes: if the change in perceived depth is in a first range, controlling the output signal to produce sound that is greater in a first direction than a second direction; and if the change in perceived depth is in a second range, controlling the output signal to produce sound that is greater in the second direction than the first direction, wherein the first direction is in a front to rear direction and the second direction is in a left to right direction relative to a display.

The controlling step may also include determining a setting value of at least one parameter for outputting the audio signal, wherein the parameter is one set in proportion to increase or decrease based on the change in perceived depth. The parameter may be a center level parameter, a rear level parameter, a first expansion intensity parameter or a high frequency parameter. Or, the parameter is a front level parameter, a Low Frequency Effects (LFE) level parameter, a second expansion intensity parameter or a reverb part parameter.

The method may further comprise increasing a first parameter and decreasing a second parameter value when the change in perceived depth is in a first range; and decreasing the first parameter value and increasing the second parameter value when the change in perceived depth is in a second range.

According to another embodiment, a display device comprises a video input to receive first data for an object to be displayed at a first point in time and to receive second data for the object to be displayed at a second point in time, the second point in time being after the first point in time; and a controller to determine a difference between the first and second data and to control output of an audio signal based on the difference, wherein the difference is indicative of a change in perceived depth by a viewer.

The controller may generate a first disparity map based on the first data; generate a second disparity map based on the second data; and determine the change in perceived depth based on the first and second disparity maps.

Also, the first data may be a first frame comprising left and right images and the second data may be a second frame comprising left and right images, the first disparity map is generated based on a comparison of the left and right images of the first frame, and the second disparity map is generated based on a comparison of the left and right images of the second frame.

The controller may also generate a first histogram from the first disparity map; generate a second histogram from the second disparity map; and determine the change in perceived depth based on a comparison of the first and second histograms.

The determining operation may include identifying a peak position in the first histogram; identifying a peak position in the second histogram; and determining the change in perceived depth based on a difference between the peak positions of the first and second histograms.

In addition, the controller may control the output signal to produce sound that is greater in a first direction than a second direction when the change in perceived depth is in a first range; and control the output signal to produce sound that is greater in the second direction than the first direction when the change in perceived depth is in a second range, wherein the first direction is in a front to rear direction and the second direction is in a left to right direction relative to a display.

In addition, the controller may determine a setting value of at least one parameter for outputting the audio signal, wherein the parameter is one set in proportion to increase or decrease based on the change in perceived depth.

In addition, the parameter may be a center level parameter, a rear level parameter, a first expansion intensity parameter or a high frequency parameter, or the parameter may be a front level parameter, a Low Frequency Effects (LFE) level parameter, a second expansion intensity parameter or a reverb part parameter.

In addition, the controller may increase a first parameter and decreasing a second parameter value when the change in perceived depth is in a first range; and decrease the first parameter value and increasing the second parameter value when the change in perceived detected depth is in a second range.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments. The features of one embodiment may be combined with the features of one or more of the other embodiments described herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a display device, comprising:
   receiving an image signal and an audio signal, wherein the image signal comprises a previous frame object to be displayed on a display screen at a previous point in time and a current frame to be displayed on the display screen at a current point in time, the current point in time being after the previous point in time, wherein each of the previous frame and the current frame comprises left and right images;
   comparing the left and right images of the previous frame to generate a disparity map for the, previous frame;
   generating a first histogram from the disparity map of the previous frame;
   comparing the left and right images of the current frame to generate a disparity map for the current frame;
   generating a second histogram from the disparity map of the current frame;
   determining a difference value between the first histogram and the second histogram; and
   controlling output of the audio signal received in coorespondence with the image signal based on the difference value.

2. The method of claim 1, wherein said determining comprises:
   identifying a peak position in the first histogram;
   identifying a peak position in the second histogram; and determining the difference value between the peak positions of the first and second histograms.

3. The method of claim 1, wherein said controlling comprises:
determining a setting value of at least one parameter for outputting the audio signal, wherein the parameter is one set in proportion to increase or decrease based on the difference value.

4. The method of claim 3 wherein the parameter a center level parameter, a rear level parameter, a first expansion intensity parameter or a high frequency parameter.

5. The method of claim 3, wherein the parameter is a front level parameter, a Low Frequency Effects (LFE) level parameter, a second expansion intensity parameter or a reverb part parameter.

6. The method of claim 3, further comprising:
increasing a first parameter value and decreasing a second parameter value when the difference value is in a first range; and
decreasing the first parameter value and increasing the second parameter value when the difference value is in a second range.

7. A display device comprising:
a display;
a video input to receive an image signal inputted with an audio signal, wherein the image signal comprises a previous frame to be displayed at a previous point in time and a current frame to be displayed at a current point in time, the current point in time being after the previous point in time, wherein each of the previous frame and the current frame comprises left and right images; and
a controller to compare the left and right images of the previous frame to generate a disparity map for the previous frame, to generate a first histogram from the disparity map for the previous frame, to compare the left and right images of the current frame to generate a disparity map of the current frame, to generate a second histogram from the disparity map of the current frame, to determine a difference value between the first histogram and second histogram and to control output of the audio signal received in correspondence with the image signal based on the difference value.

8. The display device of claim 7, wherein said determining comprises:
identifying a peak position in the first histogram;
identifying a peak position in the second histogram; and
determining the difference value between the peak positions of the first and second histograms.

9. The display device of claim 7, wherein the controller:
determines a setting value of at least one parameter for outputting the audio signal, wherein the parameter is one set in proportion to increase or decrease based on the difference value.

10. The display device of claim 9 wherein the parameter a center level parameter, a rear level parameter, a first expansion intensity parameter or a high frequency parameter.

11. The display device of claim 9, wherein the parameter is a front level parameter, a Low Frequency Effects (LFE) level parameter, a second expansion intensity parameter or a revert) part parameter.

12. The display device of claim 9, wherein the controller:
increases a first parameter value and decreasing a second parameter value when the difference value is in a first range; and
decreases the first parameter value and increasing the second parameter value when the difference value is in a second range.

13. A method of controlling a display device, comprising:
receiving a previous frame to be displayed on a display screen at a previous point in time, wherein the previous frame comprises left and right images;
receiving a current frame to be displayed on the display screen at a current point in time, the current point in time being after the previous point in time, wherein the current frame comprises left and right images;
comparing the left and right images of the previous frame to generate a disparity map for the previous frame;
generating a first histogram from the disparity map of the previous frame;
comparing the left and right images of the current frame to generate a disparity map for the current frame;
generating a second histogram from the disparity map of the current frame;
determining a difference value between the first histogram and the second histogram; and
controlling output of an audio signal received in correspondence with the current frame based on the difference value.

14. The method of claim 1, wherein the controlling comprises:
if the difference value is in a first range, controlling the output signal to produce sound that is greater in a first direction than a second direction; and
if the difference value is in a second range, controlling the output signal to produce sound that is greater in the second direction than the first direction, wherein the first direction is in a front to rear direction and the second direction is in a left to right direction relative to a display.

15. The display device of claim 7, wherein the controller:
controls the output signal to produce sound that is greater in a first direction than a second direction when the difference value is in a first range; and
controls the output signal to produce sound that is greater in the second direction than the first direction when the difference value is in a second range, wherein the first direction is in a front to rear direction and the second direction is in a left to right direction relative to the display.

* * * * *